United States Patent
Hirose et al.

[15] 3,659,921
[45] May 2, 1972

[54] ZOOM LENS CAPABLE OF EXTREME CLOSEUP PHOTOGRAPHY

[72] Inventors: Ryusho Hirose; Eiichi Takano, both of Tokyo, Japan

[73] Assignee: Canon Kabushiki Kaisha, Tokyo, Japan

[22] Filed: July 23, 1970

[21] Appl. No.: 57,520

[30] Foreign Application Priority Data
July 26, 1969 Japan................44/58743

[52] U.S. Cl..........................350/186, 350/214
[51] Int. Cl............................G02b 15/18
[58] Field of Search......................350/184, 186

[56] References Cited

UNITED STATES PATENTS 3,391,973  7/1968  Laurent....................350/186 X

FOREIGN PATENTS OR APPLICATIONS 975,309  11/1964  Great Britain..................350/184

Primary Examiner—John K. Corbin
Attorney—Joseph M. Fitzpatrick, John Thomas Cella, Charles B. Cannon, Lawrence F. Scinto, Carroll G. Harper, Charles W. Bradley, Edwin T. Grimes, William J. Brunet and Robert L. Baechtold

[57] ABSTRACT

Zoom lens of this invention is capable of extreme closeup photography. The zoom lens has a positive power focusing lens, a negative power variator, a negative power compensator and a relay lens consisting of a movable front and a fixed rear positive power lens groups. In zooming operation, the variator is one-way shifted while the compensator is reciprocatingly shifted. In focusing, the focusing lens is shifted for an object from an infinity to a usual distance. For close-up photography the focusing lens is shifted to its extreme foremost end and the front group of the relay lens is shifted toward the image plane.

5 Claims, 7 Drawing Figures

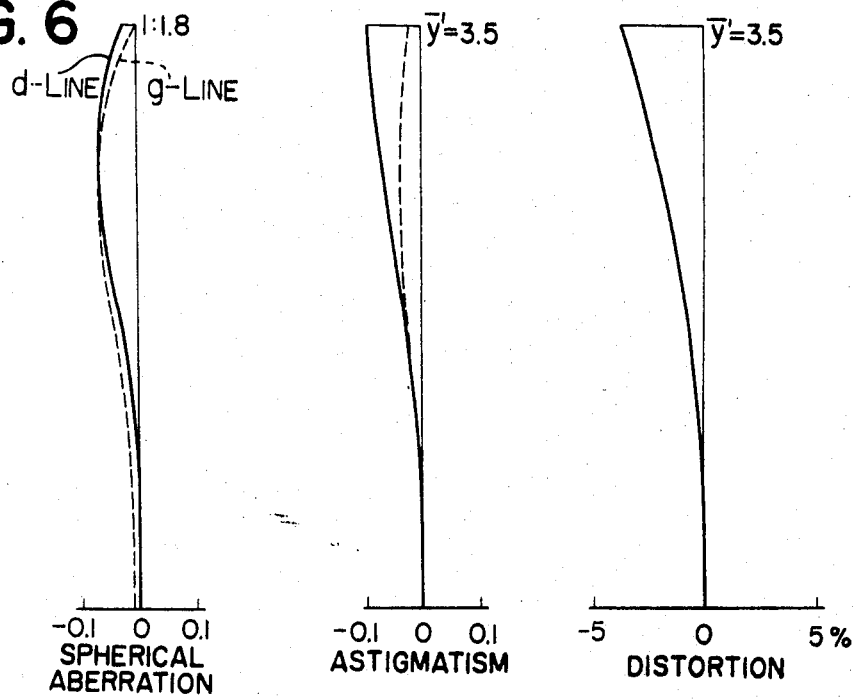
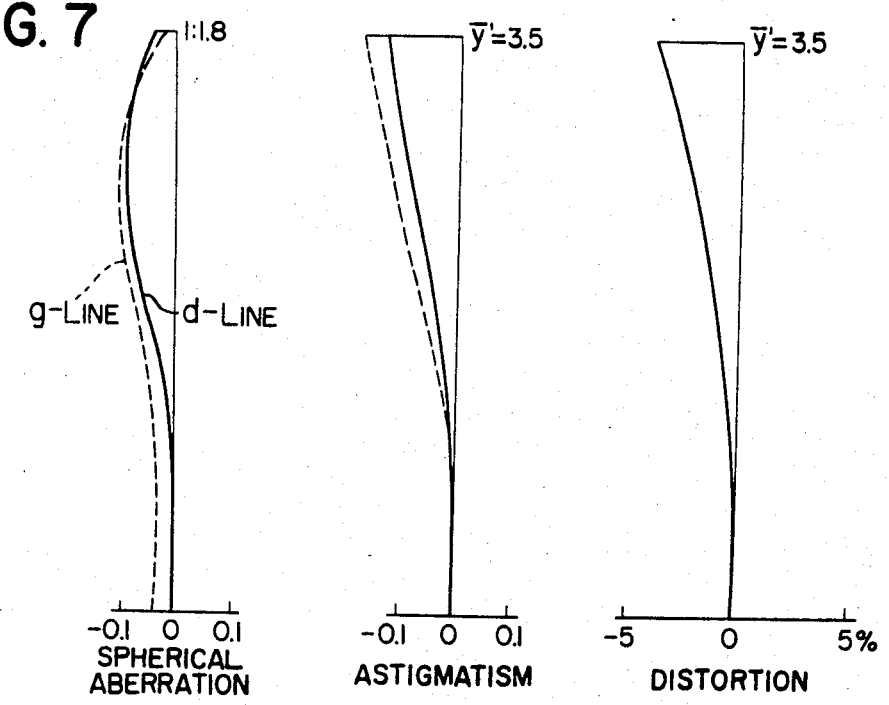

ZOOM LENS CAPABLE OF EXTREME CLOSEUP PHOTOGRAPHY

1. Field of Invention

The present invention relates to a zoom lens capable of extreme closeup photography.

2. Description of the Prior Arts

In the conventional zoom lens comprising a positive power focusing lens, a negative power variator lens, a negative power compensator lens and a positive power relay lens arranged in the order named from front to rear, an object in extreme short distance is focused by shifting forward the focusing lens. In this system in order to focus an object at an extreme short distance for example a few centimeters to a few milimeters, the aperture of the focusing lens must be exceedingly increased so that the correction of the optical aberrations becomes extremely difficult. Therefore, in the conventional zoom lens system, the closest focal range is of the order of 1 meter.

SUMMARY OF THE INVENTION

The present invention relates to a zoom lens capable of extreme closeup photography which can eliminate the defects encountered in the conventional zoom lens without increasing the overall length of the zoom lens and adversely affecting the error correction. An object from infinity to an extreme close range may be photographed. The present invention is characterized in that the relay lens of the zoom lens system is divided into a front and rear positive power lens groups, the front lens group being movable; and an object from infinity to usual focal range is focused by shifting the focusing lens forward while an object closer than the usual focal range is focused by shifting the first lens group of the relay lens to the image or focal plane.

BRIEF DESCRIPTION OF THE DRAWING

FIGS. 6 and 7 depict the abberation curves when the focal length is the shortest while the objects are at infinity and 12.5 cm respectively.

DESCRIPTION OF THE PREFERRED EMBODIMENT

Figure 1:
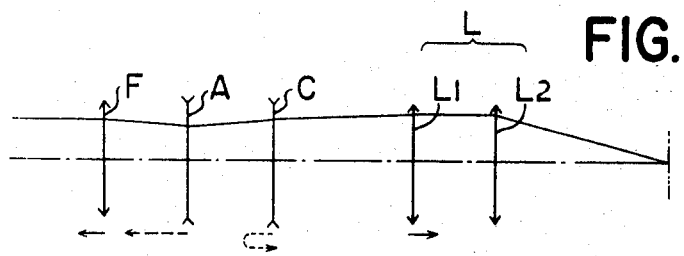
FIG. 1 is a diagrammatic view of a zoom lens in accordance with the present invention.

Referring to FIG. 1, the zoom lens in accordance with the present invention comprises a positive power focusing lens F, a negative power variator A, a negative power compensator lens C and relay lens L consisting of a front and rear positive power lens groups $L_1$ and $L_2$, the front lens group $L_1$ being movable. In zooming, the variator lens A is shifted as indicated by the dotted arrow while the compensator lens C is reciprocated as indicated by the dotted arrow. In focusing the focusing lens F is shifted as indicated by the arrow for an object from infinity to a usual distance. For extreme closeup photography the focusing lens F is shifted to its extreme foremost end and the front group $L_1$ is shifted toward the image plane as indicated by the arrow.

Figure 2:
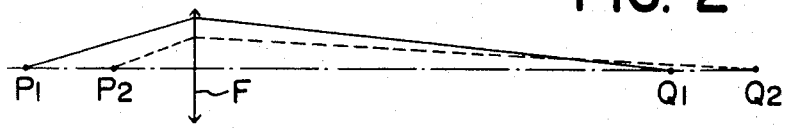
FIGS. 2, 3, and 4 are diagrammatic views illustrating the relations between the objects and their images focused by each lens.
Figure 3:
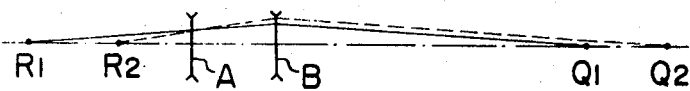
Figure 4:
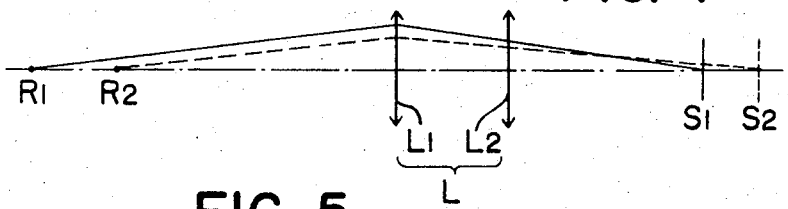

Referring to FIG. 2, the point $P_1$ is the closest point to be imaged when the focusing lens F is shifted to its foremost position and in this case the point $P_1$ is imaged at $Q_1$. The point $P_2$ closer to the focusing lens is imaged at the point $Q_2$. These points $Q_1$ and $Q_2$ in turn are the objects to be imaged by the variator lens A and the compensator C of the zoom lens at $R_1$ and $R_2$ system as shown in FIG. 3. These image $R_1$ and $R_2$ in turn are the objects to be imaged at $S_1$ and $S_2$ by the relay lens L in its normal position. The film is placed at $S_1$ so that the first object $P_1$ may be imaged upon the film correctly, but the object $P_2$ closer to the focusing lens is not imaged upon the film. That is, the object $P_2$ is out of focus.

The present invention is based upon the observed fact when the relay lens L is divided into the front and rear lens groups $L_1$ and $L_2$ and the front lens group $L_1$ is shifted toward the image plane, the object $R_2$ may be imaged at the point $S_1$ which is the image of the object $R_1$ as described above. In this case, the shift $x$ is given by the following expression:

$$x = m(m + 2L_1)/(m + L_1)$$

where $m = C(Z - e_{AC})/(C - e_{AC} + Z)$ $Z = A(F - e_{FA})/(A + F - e_{FA})$ $e_{AC}$ = the distance between the principal points of the variator A and the compensator C at an optional zooming position;

$e_{FA}$ = the distance between the principal points of the focusing lens F and the variator A at an optional zooming position;

$L_1$ and $L_2$ = the focal lengths of the front and rear lens groups $L_1$ and $L_2$ of the relay lens L;

$C$ = focal length of the compensator C, $A$ = focal length of the variator A, and $F$ = focal length of the focusing lens F.

($e_{FA}$ and $e_{AC}$ are correlated in order to keep the focal plane constant in the ordinary zooming.)

The focusing lens F, the variator A, and the compensator C are similar to those used in the conventional zoom lens system so that errors may be well corrected without increasing the diameter of the focusing lens and the overall dimensions of the zoom lens system. In the zoom lens of the character described above, the center line of the off-axis light bundle intersects the optical axis in front of the relay lens so that the errors may be well corrected without varying too much the astigmatism even when the front group of the relay lens is shifted in the proximity of the point at which the center of the off-axis light bundle intersects the optical axis.

From the standpoint of design, it would be convenient to use the front lens group $L_1$ having a higher index of refraction because the shift may be minimized in closeup photography, but when the index of refraction is too high, the spherical aberration becomes too much to be neglected. Therefore, the focal length $L_1$ of the front lens group is so selected as to satisfy the following relation:

$$L_1 \geq \frac{1}{\sqrt{Z_0}} \frac{F}{A+F} + e'_{AC}$$

where $Z_0$ = zoom ratio, and $e'_{AC}$ = the distance between principal points of the variator A and the compensator C in wide angle position.

Then, the adverse effect of the spherical aberration may be prevented so that the errors in extreme closeup photography may be well corrected.

Figure 5:
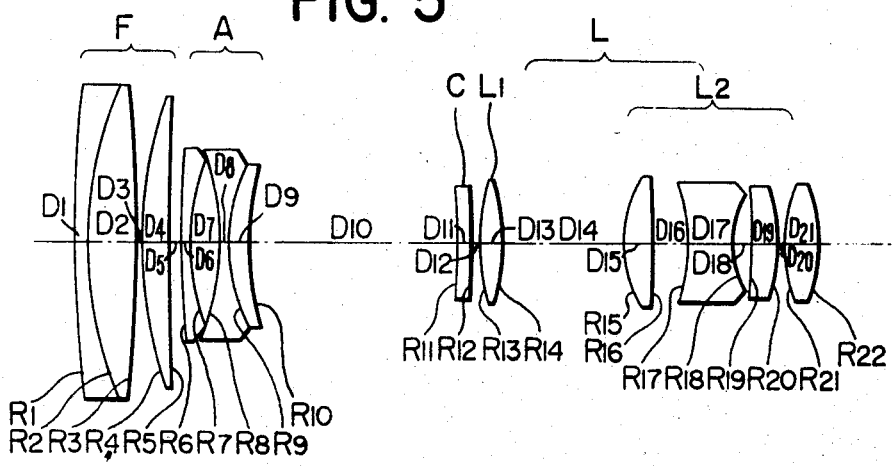
FIG. 5 is a diagrammatic view of one embodiment of the present invention.

FIG. 5 depicts one embodiment of the present invention and its design data are given below:

Focal length $f = 11–26.5$; aperture ratio: 1:1.8; zoom ratio = 2.5

| | Glass | Refractive Index | Abbe Number |
|---|---|---|---|
| $R_1 = 146.16$ | | | |
| $D_1 = 1.40$ | SF 13 | 1.74077 | 27.8 |
| $R_2 = 36.27$ | | | |
| $D_2 = 4.50$ | SSK 5 | 1.65844 | 50.9 |
| $R_3 = -182.19$ | | | |
| $D_3 = 0.20$ | | | |
| $R_4 = 40.85$ | | | |
| $D_4 = 3.00$ | SK 14 | 1.60311 | 60.7 |
| $R_5 = 353.33$ | | | |
| $D_5 =$ variable | | | |
| $R_6 = 106.25$ | | | |
| $D_6 = 0.90$ | SK 7 | 1.60729 | 59.4 |
| $R_7 = 23.36$ | | | |
| $D_7 = 2.00$ | | | |
| $R_8 = -30.59$ | | | |
| $D_8 = 1.00$ | SSK 2 | 1.62230 | 53.2 |
| $R_9 = 15.14$ | | | |
| $D_9 = 1.75$ | SF 13 | 1.74077 | 27.8 |

| | | | |
|---|---|---|---|
| $R_{10} = 30.41$ | | | |
| $D_{10}$ = variable | | | |
| $R_{11} = -53.74$ | | | |
| $D_{11} = 0.90$ | SK 14 | 1,60311 | 60.7 |
| $R_{12} = -496.35$ | | | |
| $D_{12}$ = variable | | | |
| $R_{13} = 61.00$ | | | |
| $D_{13} = 1.50$ | LAK01 | 1,64000 | 60.2 |
| $R_{14} = -35.43$ | | | |
| $D_{14}$ = variable | | | |
| $R_{15} = 11.02$ | | | |
| $D_{15} = 2.50$ | LAK 8 | 1,71300 | 54.0 |
| $R_{16} = -110.00$ | | | |
| $D_{16} = 3.14$ | | | |
| $R_{17} = -14.67$ | | | |
| $D_{17} = 4.73$ | SF 11 | 1,78472 | 25.7 |
| $R_{18} = 10.92$ | | | |
| $D_{18} = 0.85$ | | | |
| $R_{19} = -44.00$ | | | |
| $D_{19} = 2.50$ | LAK 02 | 1,67000 | 57.4 |
| $R_{20} = -14.50$ | | | |
| $D_{20} = 0.10$ | | | |
| $R_{21} = 15.67$ | | | |
| $D_{21} = 2.40$ | LAK 09 | 1,73400 | 51.5 |
| $R_{22} = -24.65$ | | | | where R with a subscript indicates the surface designated by the subscript of a lens, the surfaces being numbered from front to rear; and D with a subscript indicates the thickness of the lens or the air space along the optical axis, the thickness and air space being numbered also from front to rear.

Variable air space:

| $f = 11$ | 17.9 | 26.5 |
|---|---|---|
| $D_5 = 1.208$ | 10.930 | 17.212 |
| $D_{10} = 17.862$ | 5.032 | 1.858 |
| $D_{12} = 1.487$ | 4.591 | 1.487 |
| $D_{14} = 12$ | 12 | 12 |

$F = 51.7, A = -17.75, C = -99.92, L_1 = 35.23$ and $L_2 = 17.4$.

(The positive radius indicates a surface convex toward the front while the minus radius indicates a surface concave toward the front.)

By the zoom lens shown in the above embodiment, an object from infinity to 12.5 cm may be photographed. An object from infinity to 1.5 m may be focused by shifting forward the focusing lens while an object closer than 1.5 m may be focused by shifting the front lens group of the relay lens toward the image plane.

FIG. 6 depicts the spherical aberration, astigmatism and distortion curves when $f = 11$ mm with an object at infinity.

FIG. 7 depicts the similar curves when $f = 11$ mm with an object at 12.5 cm. It will be seen that aberrations are well corrected.

By the zoom lens in accordance with the present invention, the extreme closeup photography hitherto impossible by the conventional zoom lens may become possible without increasing the diameters of the lenses, the overall length of the zoom lens and increasing the aberrations compared with the conventional zoom lens.

What is claimed is:

1. A zoom lens capable of extreme closeup photography which comprises from front to rear; a positive power focusing lens, a negative power variator lens, a negative power compensator lens and a positive power relay lens, said relay lens having a moveable front lens group and a fixed rear lens group, said front lens group being shiftable to an image plane to focus an object closer than the usual focal range of the lens system.

2. A zoom lens according to claim 1, in which the positive power relay lens consists of positive, negative, positive and positive lenses.

3. A zoom lens according to claim 1, in which the positive power relay lens consists of positive, positive and negative lenses.

4. A zoom lens according to claim 1, in which the positive power relay lens consists of positive, positive and positive lenses.

5. A zoom lens capable of extreme closeup photography comprising a positive power focusing lens, a negative power variator lens, a negative power compensator lens and a positive power relay lens arranged in the order named from front to rear, characterized in that said relay lens comprises a front and rear lens groups, the front lens group being movable;

an object from infinity to usual focal range is focused by shifting forward said focusing lens while an object closer than said usual focal range is focused by shifting said front lens group of said relay lens to the image side; and the focal length $L_1$ of said first lens group satisfies the relation of $$L_1 \geq \frac{1}{\sqrt{Z_o}} \frac{F}{A+F} + e'_{AC}$$

where $F$ = focal length of the focusing lens;
$A$ = focal length of the variator lens;
$Z_o$ = zoom ratio; and
$e'_{AC}$ = distance between the principal points of the variator and compensator lenses in wide angle position.

* * * * *